US006216736B1

(12) United States Patent
Benedetti

(10) Patent No.: US 6,216,736 B1
(45) Date of Patent: Apr. 17, 2001

(54) THREE-WAY ANTIMIX VALVE FOR A POURABLE FOOD PRODUCT PACKAGING MACHINE

(75) Inventor: Paolo Benedetti, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/546,525

(22) Filed: Apr. 11, 2000

(30) Foreign Application Priority Data

Jun. 4, 1999 (EP) ................................................ 99830344

(51) Int. Cl.[7] .................................................. F16K 11/083
(52) U.S. Cl. ...................................... 137/625.47; 137/312
(58) Field of Search .............................. 137/312, 625.41, 137/625.47

(56) References Cited

U.S. PATENT DOCUMENTS 3,643,679 2/1972 Hansson ............................... 137/241
3,693,640 9/1972 Wettlen et al. ....................... 134/169
3,716,083 2/1973 Tuma et al. ............................ 141/90
3,907,688 * 9/1975 Close .................................. 210/424
4,173,234 * 11/1979 Thomas et al. ................. 137/625.47
4,243,160 1/1981 Reil ...................................... 222/373
4,387,547 6/1983 Reil ........................................ 53/131
4,608,810 9/1986 Bordini ................................. 53/551
4,648,421 3/1987 Chant et al. ......................... 137/312
4,887,160 12/1989 Kinoshita et al. .............. 358/213.26
5,025,991 6/1991 Stainbrook et al. ................. 239/459
5,916,201 * 6/1999 Wilson, Jr. et al. ............ 137/625.47

* cited by examiner

*Primary Examiner*—John Fox
(74) *Attorney, Agent, or Firm*—Burns, Doane, Swecker & Mathis, L.L.P.

(57) ABSTRACT

A three-way antimix valve (1) for a pourable food product packaging machine, the valve having a casing (2) in turn having a lateral wall (4) which defines a cavity (6) having an axis of symmetry (A) and communicating with a bottom drain opening (7), and has three gates (10, 11, 12) spaced 90° apart; and a rotary shutter (3) housed inside the cavity (6), rotating about the axis (A), and having a lateral surface (20) in which are formed two openings (22, 23) spaced 90° apart and communicating with each other via an inner passage (24) for connecting respective pairs (10,12; 11,12) of gates in two respective work positions (a, b) of the shutter (3); the casing (2) has two recesses (17, 18) spaced 90° apart and each located in an intermediate position between a respective pair (10,12; 11,12) of gates; and the shutter (3) has four recesses (25, 26, 27, 28) spaced 90° apart, and one (25) of which is located between the two openings (22, 23) to connect the passage (24) and the three gates (10, 11, 12) to the drain opening (7) in an intermediate position (c) of the shutter (3).

11 Claims, 3 Drawing Sheets

THREE-WAY ANTIMIX VALVE FOR A POURABLE FOOD PRODUCT PACKAGING MACHINE

FIELD OF THE INVENTION

The present invention relates to a three-way antimix valve for a pourable food product packaging machine.

BACKGROUND OF THE INVENTION

Machines for packaging pourable food products, such as fruit juice, wine, tomato sauce, pasteurized or long-storage (UHT) milk, etc., are known in which packages are formed from a continuous tube of packaging material defined by a longitudinally sealed strip.

The packaging material has a multilayer structure comprising a layer of paper material covered on both sides with layers of heat-seal material, e.g. polyethylene. In the case of aseptic packages for long-storage products such as UHT milk, the packaging material comprises a layer of barrier material defined, for example, by an aluminium film, which is superimposed on a layer of heat-seal plastic material and is in turn covered with another layer of heat-seal plastic material which eventually defines the inner face of the package contacting the food product.

For producing aseptic packages, the strip of packaging material is unwound off a reel and fed through a sterilizing unit in which it is sterilized, for example, by immersion in a bath of liquid sterilizing agent such as a concentrated solution of hydrogen peroxide and water.

More specifically, the sterilizing unit comprises a bath filled, in use, with the sterilizing agent in which the strip is fed continuously; and an aseptic chamber in which the strip of packaging material issuing from the sterilizing bath is treated to remove any residual sterilizing agent, e.g. by means of drying rollers and jets of high-temperature sterile air.

Before leaving the aseptic chamber, the strip is folded into a cylinder and sealed longitudinally to form in known manner a continuous, vertical, longitudinally sealed tube. The tube of packaging material, in fact, forms an extension of the aseptic chamber and is filled continuously with the pourable product and then fed to a forming and (transverse) sealing unit for forming individual packages and by which the tube is gripped between pairs of jaws to seal the tube transversely and form aseptic pillow packs.

The pillow packs are separated by cutting the sealed portions between the packs, and are then fed to a final folding station where they are folded mechanically into the finished form.

On known machines of the type briefly described above, the tube of packaging material is filled continuously by a conduit forming part of a circuit for supplying the pourable food product for packaging (hereinafter referred to simply as the "product circuit"). The product circuit must be sterilized with aseptic air before the start of each processing cycle, and flushed with a liquid solution at the end of the work cycle; for which purpose, the product circuit must therefore be connected selectively to a flush solution supply circuit and a sterile-air supply circuit by means of a switching assembly for preventing mixing of the various fluids and any traces of the flush solution in the product due to imperfect sealing. For safety reasons and to ensure sterility of the product circuit, the product circuit is normally connected to the switching assembly by means of a service conduit fitted with a two-way, aseptic, e.g. steam-barrier, on-off valve.

Substantially two switching assembly design solutions are known.

A first consists simply in using a movable fitting connected permanently to the service conduit of the product circuit and having connecting means for selective connection to the flush solution and sterile-air supply circuits. Though straightforward and cheap, this solution has the drawback of switching manually from one work stage to the other, by physically disconnecting and reconnecting the movable fitting to the relative circuits.

A second known solution consists in using three three-way valves, each of which has a pair of gates connected to a respective pair of circuits, and a third gate connected to a drain conduit for draining off any leakage from the valve and so preventing undesired leakage caused by pressure on the seals of the other valves.

Though enabling automatic switching, this second solution is expensive and involves considerable load losses.

SUMMARY OF THE INVENTION

It is an object of the present invention to provide a three-way antimix valve designed to eliminate the aforementioned drawbacks typically associated with known switching assemblies.

According to the present invention, there is provided a three-way antimix valve for a pourable food product packaging machine, the valve comprising a casing having a lateral wall defining a cavity having an axis of symmetry and communicating with a bottom drain opening; and a rotary shutter rotating about said axis and housed in said cavity with a respective lateral surface cooperating in fluidtight manner with said lateral wall of said casing; said casing having a first gate and a second gate, both formed in said lateral wall and spaced angularly by a first angle, and a third gate formed in said lateral wall in an intermediate position with respect to said first and second gate and spaced angularly with respect to each by a second angle equal to half said first angle; said rotary shutter having a first and a second opening, both formed in said lateral surface and spaced angularly by an angle equal to said second angle, and an inner passage connecting said first and second opening; said lateral wall of said casing having two inner recesses formed respectively between said first gate and said third gate and between said second gate and said third gate; said rotary shutter comprising at least three recesses, of which a first recess is formed between said first and second opening, a second recess is formed on the opposite side of said second opening with respect to said first recess and spaced angularly with respect to the first recess by an angle equal to said second angle, and a third recess is located on the opposite side of said first opening with respect to said first recess and spaced with respect to the first recess by an angle equal to said second angle; said recesses of said casing and said recesses of said rotary shutter communicating with said bottom drain opening of said casing; said valve comprising actuating means for moving said rotary shutter between a first work position in which said first and second opening of said rotary shutter communicate respectively with said first gate and said third gate of said casing, an intermediate position in which said first and second opening of said rotary shutter communicate with respective said recesses of said casing, and said first, second and third gate of said casing communicate with respective recesses of said rotary shutter, and a second work position in which said first and second opening of said rotary shutter communicate respectively with said third gate and said second gate of said casing.

DESCRIPTION OF THE DRAWINGS

A preferred, embodiment of the present invention will be described purely by way of example with reference to the accompanying drawings, in which.

DETAILED DESCRIPTION OF THE INVENTION

Figure 1:
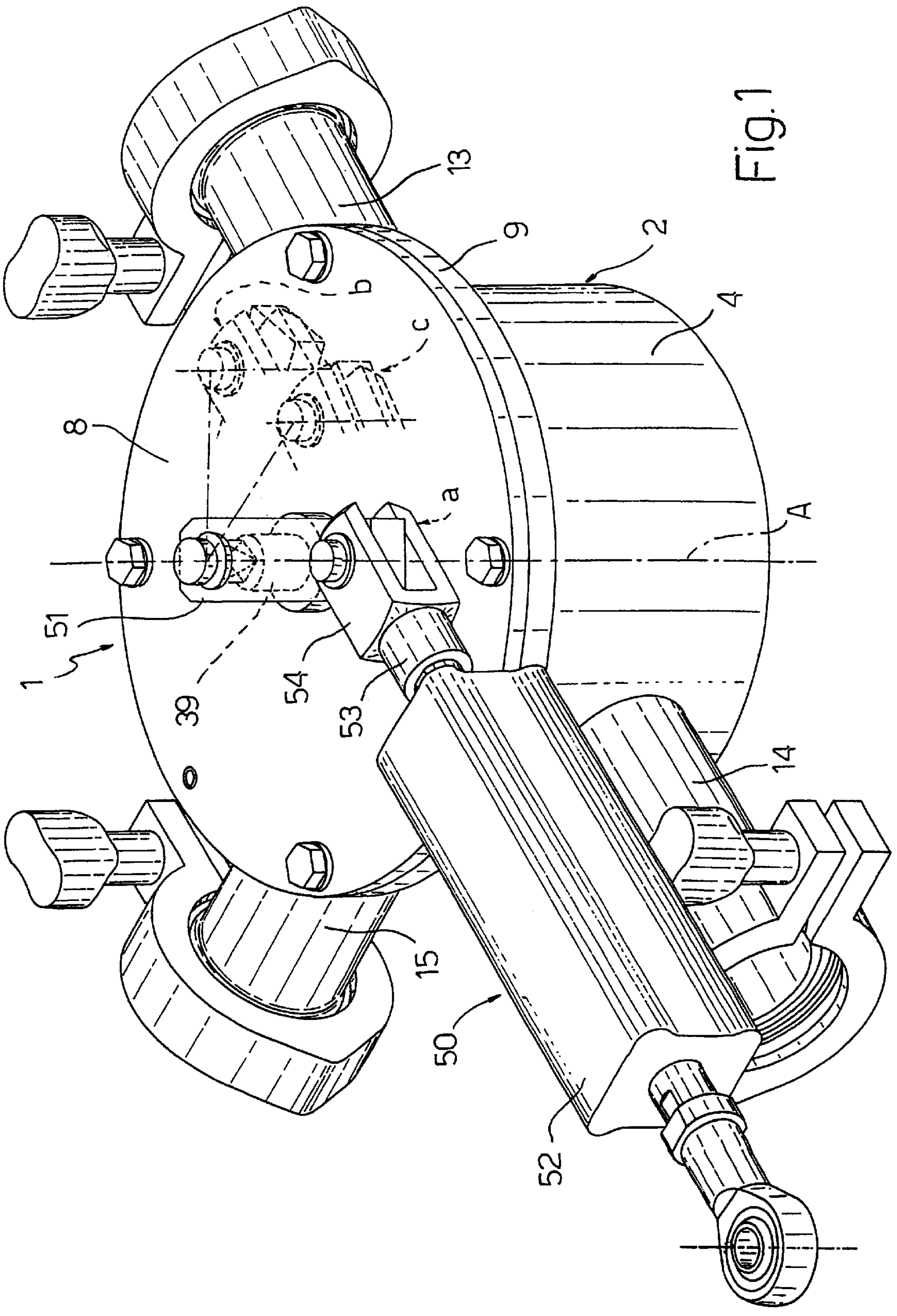
FIG. 1 shows a view in perspective of a valve in accordance with the present invention.
Figure 2:
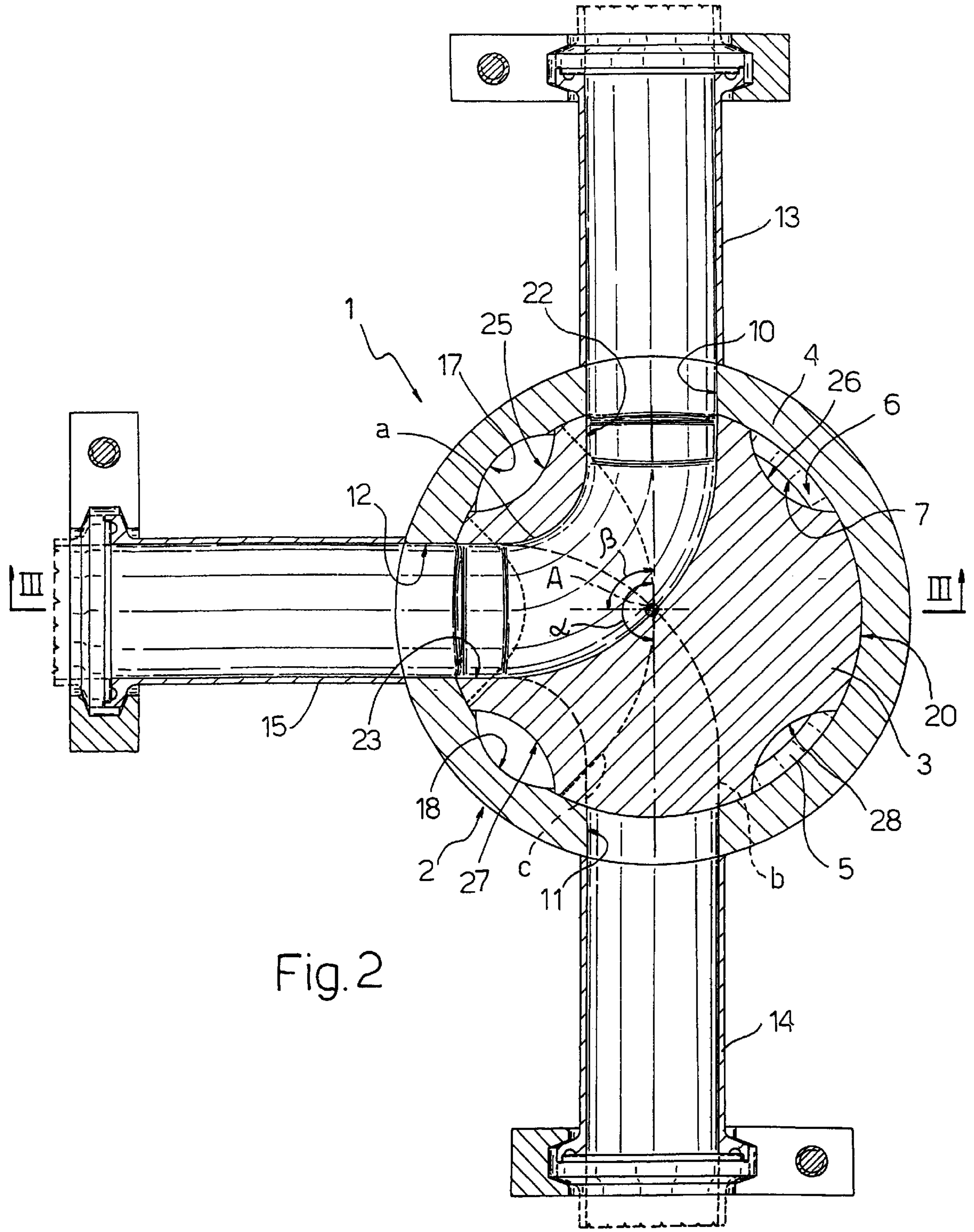
FIG. 2 shows a cross section of the FIG. 1 valve.
Figure 3:
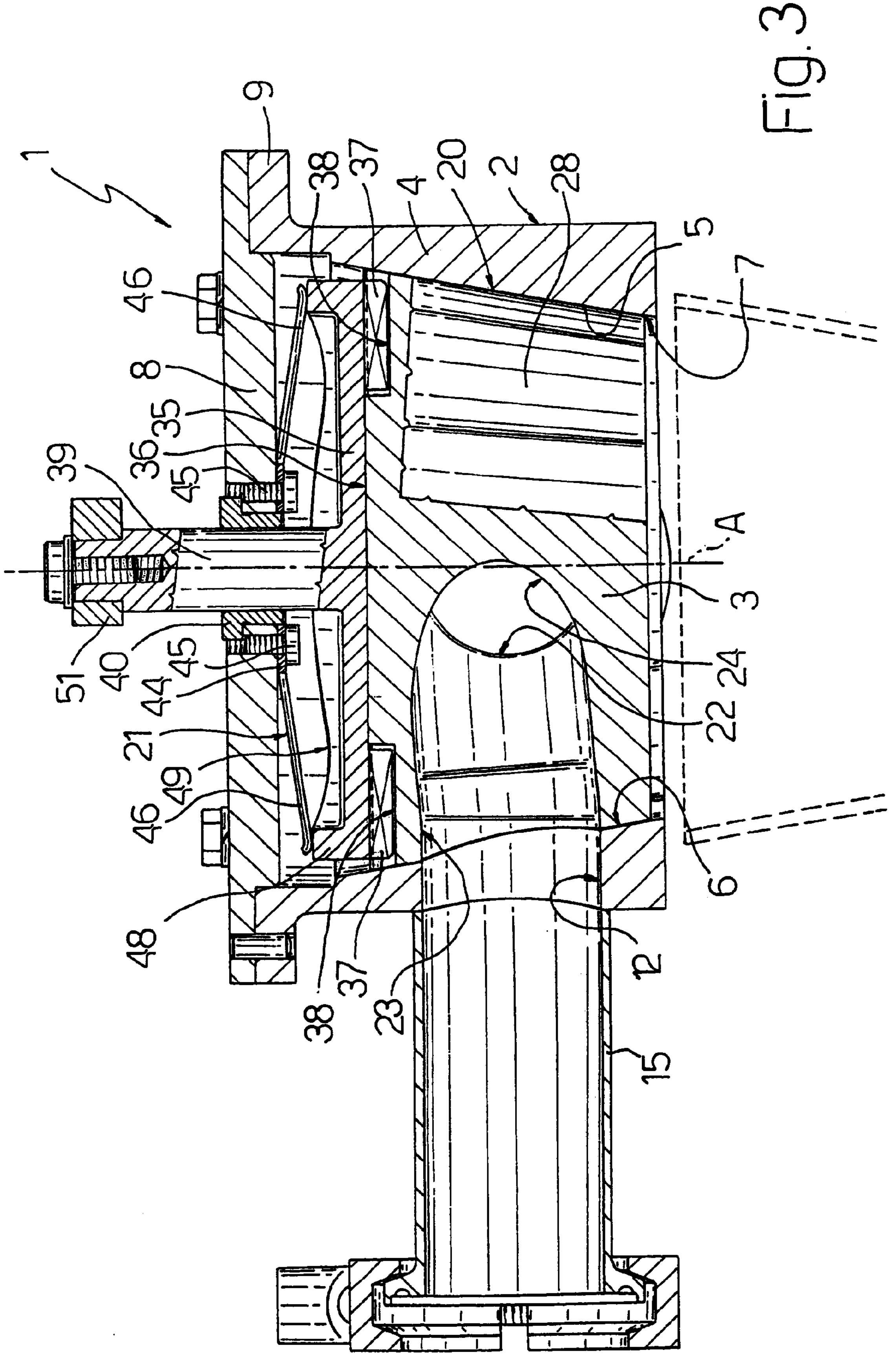
FIG. 3 shows a section along line III—III in FIG. 2.

A preferred embodiment of the three way antimix valve in accordance with this invention is indicated in FIGS. 1–3 by the reference numeral 1. The valve 1 substantially comprises an outer casing 2 of axis A; and a rotary shutter 3 housed in casing 2 and rotating about axis A. Casing 2 substantially comprises a lateral wall 4 having a conical inner surface 5 tapering downwards and defining a cavity 6 communicating externally via a bottom drain opening 7. Casing 2 also comprises a top cover 8 fitted to a top annular flange 9 of lateral wall 4.

Lateral wall 4 (FIG. 2) comprises three substantially circular through openings or gates 10, 11, 12, at which originate respective connecting conduits 13, 14, 15. More specifically, gates 10 and 11 are diametrically opposite and coaxial with each other (i.e. the respective axes form a center angle $\alpha$ of 180°) and are connected by respective connecting conduits 13, 14 to a sterile-air supply circuit (not shown) and to a liquid flush solution supply circuit (not shown); whereas the third gate 12 is located in an intermediate position with respect to gates 10, 11, so as to form with each a center angle $\beta$ of 90°, and is connected by respective connecting conduit 15 to a service conduit forming part of a circuit for the pourable food product for packaging, and which is fitted with a further on-off valve (not shown).

Lateral wall 4 also comprises two recesses 17, 18, which are defined by concave, cylindrical-bottomed grooves with generating lines parallel to axis A, extend respectively between gates 10 and 12 and gates 11 and 12 along respective generating lines of inner surface 5 of lateral wall 4, and communicate with bottom drain opening 7.

Shutter 3 comprises a conical lateral surface 20 cooperating in fluidtight manner with inner surface 5 of lateral wall 4 of casing 2 by virtue of a spring 21, as described in detail later on. Shutter 3 comprises a first opening 22 and a second opening 23, both formed in lateral surface 20, spaced 90° with respect to each other, and connected to each other by an elbow passage 24 (FIG. 2) defining a 90° curve. Shutter 3 also comprises four recesses 25, 26, 27, 28 equally spaced angularly and extending along respective generating lines of lateral surface 20. Like recesses 17, 18, recesses 25, 26, 27, 28 have cylindrical bottom surfaces with generating lines parallel to axis A, and communicate with bottom drain opening 7 of casing 2. More specifically, recess 25 is located between openings 22 and 23; recesses 26 and 27 are located on opposite sides of respective openings 22 and 23 with respect to recess 25; and recess 28 is diametrically opposite recess 25.

Passage 24 (FIG. 3) conveniently slopes from a respective intermediate portion towards openings 22, 23, so as to improve drainoff of the liquid inside the passage towards openings 22, 23.

Shutter 3 is conveniently made of a good sealing polymer with a low coefficient of friction to improve under-load rotation of shutter 3 inside casing 2; for which purpose, PTFE-based composite materials may conveniently be used, such as Rulon® J manufactured by FURON COMPANY, Laguna Niguel, Calif. (U.S.A.).

Valve 1 also comprises a disk 35, of axis A, for driving shutter 3, and which rests on a top face 36 of shutter 3 and is angularly connected to shutter 3 by two face teeth 37 extending downwards from disk 35 and engaging respective seats 38 formed on face 36 of shutter 3. Disk 35 has an axial control shaft 39 extending integrally upwards from the disk and fitted through cover 8, inside a bush 40.

Spring 21 (FIG. 3) is interposed between cover 8 and disk 35 to keep disk 35 and shutter 3 engaged, and also to increase the contact pressure between lateral surface 20 of shutter 3 and inner surface 5 of lateral wall 4 of casing 2. Spring 21 comprises a central annular connecting portion 44 fitted to cover 8 and about shaft 39 by means of a number of screws 45; and a number of blade-type arms 46 projecting radially from portion 44 and cooperating elastically with a peripheral flange 48 of disk 35, which flange has a shaped upper surface 49. More specifically, surface 49 is undulated so as to variably flex arms 46 of spring 21 as shutter 3 rotates. Which flexure is conveniently maximum in the work positions of the valve, so as to increase the elastic reaction of spring 21 and, hence, the contact pressure between surface 20 of shutter 3 and surface 5 of casing 2, and is less in the intermediate positions to assist rotation of shutter 3.

Rotation of shutter 3 is controlled by a three-position pneumatic actuator 50 (FIG. 1) which acts on control shaft 39 via a crank 51. More specifically, actuator 50 comprises a cylinder 52 hinged to a fixed structure (not shown) of the machine; and a rod 53 movable axially with respect to cylinder 52 and having a fork-shaped free end 54 hinged to one end of crank 51. The opposite end of crank 51 is connected prismatically to shaft 39.

Operation of valve 1 will now be described as of a first work position indicated by the letter a in FIG. 2 and wherein openings 22, 23 of shutter 3 are positioned facing respective gates 10, 12 of casing 2; gates 10, 12 are therefore connected to each other by passage 24 of shutter 3; and the product circuit is therefore connected to the sterile-air supply circuit. This position is used in the course of the machine operating cycle to effect so-called pre-sterilization of the product circuit.

When shutter 3 is rotated 90° anticlockwise in FIG. 2, valve 1 is set to a second work position indicated by the letter b and wherein passage 24 connects gates 11 and 12 to connect the product circuit to the flush solution supply circuit. This position is used to flush the product circuit at the end of the work cycle.

As can be seen, any possibility of the fluids mixing is prevented by recesses 25, 26, 27, 28 interposed between gates 10, 11, 12. That is, to get from one gate to another, any leakage due to imperfect sealing of shutter surface 20 and surface 5 of casing 2 is first intercepted by one of said recesses and drained off through drain opening 7.

Between the above two work positions, shutter 3 may also assume an intermediate drain position wherein, still with reference to FIG. 2, the shutter is rotated 45° anticlockwise with respect to the first work position, or 45° clockwise with respect to the second work position, so that openings 22, 23 of shutter 3 correspond with recesses 17, 18 of casing 2, and any liquid inside passage 24 flows from passage 24 through recesses 17, 18 to drain opening 7 of casing 2. Moreover, recesses 26, 25, 27 correspond respectively with and so connect gates 10, 11, 12 to drain opening 7 to drain the circuit branches connected to the gates.

Actuator 50 is controlled by a control unit (not shown) of the packaging machine by means of known solenoid valves (not shown), which control unit coordinates operation of valve 1 with the other functions of the machine.

The advantages of valve 1 according to the present invention will be clear from the foregoing description.

In particular, as compared with known solutions featuring manually operated movable fittings, valve 1 provides for automatic selective connection of gates 10, 11, 12; switching is therefore straightforward and extremely fast; and valve 1 also provides for a drain position by which to drain off the operating fluids, in particular the flush solution.

As compared with known valve assemblies performing the same functions, valve 1 is straightforward, inexpensive, and involves very little load loss of the air or flush solution.

Clearly, changes may be made to valve 1 as described herein without, however, departing from the scope of the accompanying claims. In particular, gates 10, 11, 12 may be arranged differently, e.g. 120° apart; shutter 3 may comprise only three recesses 120° apart and each interposed between a pair of gates; and recesses 17, 18 of casing 2 and recesses 25, 26, 27, 28 of shutter 3 may have a different profile.

What is claimed is:

1. A three-way antimix valve for a pourable food product packaging machine, the valve comprising a casing having a lateral wall defining a cavity having an axis of symmetry and communicating with a bottom drain opening; and a rotary shutter rotating about said axis and housed in said cavity with a respective lateral surface cooperating in fluidtight manner with said lateral wall of said casing; said casing having a first gate and a second gate, both formed in said lateral wall and spaced angularly by a first angle, and a third gate formed in said lateral wall in an intermediate position with respect to said first and second gate and spaced angularly with respect to each by a second angle equal to half said first angle; said rotary shutter having a first and a second opening, both formed in said lateral surface and spaced angularly by an angle equal to said second angle, and an inner passage connecting said first and second opening; said lateral wall of said casing having two inner recesses formed respectively between said first gate and said third gate and between said second gate and said third gate; said rotary shutter comprising at least three recesses, of which a first recess is formed between said first and second opening, a second recess is formed on the opposite side of said second opening with respect to said first recess and spaced angularly with respect to the first recess by an angle equal to said second angle, and a third recess is located on the opposite side of said first opening with respect to said first recess and spaced with respect to the first recess by an angle equal to said second angle; said recesses of said casing and said recesses of said rotary shutter communicating with said bottom drain opening of said casing; said valve comprising actuating means for moving said rotary shutter between a first work position in which said first and second opening of said rotary shutter communicate respectively with said first gate and said third gate of said casing, an intermediate position in which said first and second opening of said rotary shutter communicate with respective said recesses of said casing, and said first, second and third gate of said casing communicate with respective recesses of said rotary shutter, and a second work position in which said first and second opening of said rotary shutter communicate respectively with said third gate and said second gate of said casing.

2. A valve as claimed in claim 1, wherein said lateral wall of said casing has a conical inner surface, and in that said lateral surface of said rotary shutter is of a corresponding conical shape; said valve comprising elastic means for axially loading said rotary shutter so as to increase the contact pressure between said lateral surface of said rotary shutter and said inner surface, of said lateral wall of said casing.

3. A valve as claimed in claim 2, wherein said recesses each have a substantially cylindrical concave bottom surface with generating lines parallel to said axis.

4. A valve as claimed in claim 2, further comprising a drive disk connected angularly to said rotary shutter and having a control shaft fitted through a top cover of said casing and activated by said actuating means.

5. A valve as claimed in claim 4, wherein said elastic means comprise at least one spring interposed between said cover and said drive disk.

6. A valve as claimed in claim 5, wherein said drive disk comprises a shaped annular flange; said spring comprising at least one flexible arm fitted to said cover and cooperating with said annular flange to generate varying axial loads on said rotary shutter alongside variations in the angular position of the rotary shutter.

7. A valve as claimed in claim 6, wherein said annular flange of said drive disk is so shaped as to generate a maximum axial load on said rotary shutter in said work positions.

8. A valve as claimed in claim 5, wherein said actuating means comprise a pneumatic cylinder with a rod; and a crank connecting said rod of said cylinder to said control shaft of said drive disk.

9. A valve as claimed in claim 1, wherein said recesses extend along generating lines of said lateral surface of said rotary shutter and of said inner surface of said lateral wall of said casing.

10. A valve as claimed in claim 1, wherein that said first angle is an angle of 180°, and in that said second angle is an angle of 90°; said rotary shutter having four said recesses equally spaced angularly.

11. A valve as claimed in claim 1, wherein said rotary shutter is made of polymer material with a good sealing capacity and a low coefficient of friction.

* * * * *